United States Patent [19]
Wiener

[11] Patent Number: 5,228,952
[45] Date of Patent: Jul. 20, 1993

[54] METHOD OF BRIGHTENING SILICEOUS FILLERS

[76] Inventor: Kenneth Wiener, 5037 Delacroix Rd., Rancho Palos Verdes, Calif. 90274

[21] Appl. No.: 870,398

[22] Filed: Apr. 17, 1992

[51] Int. Cl.$^5$ .............................................. B05D 5/00
[52] U.S. Cl. .................................... 156/662; 156/903; 252/79.2
[58] Field of Search ...................... 156/662, 663, 903; 252/79.2

[56] References Cited
U.S. PATENT DOCUMENTS 3,755,023  8/1973  Miller .............................. 156/662 X
4,530,735  7/1985  Whitehurst et al. ............ 156/665 X Primary Examiner—Thi Dang
Attorney, Agent, or Firm—Spensley Horn Jubas & Lubitz

[57] ABSTRACT

A method for increasing the brightness of siliceous materials and fillers. A siliceous material is contacted with an agent consisting of phosphorous-based acids or salts thereof. The siliceous material and the agents are mixed together and heated at a temperature and for a period of time sufficient to enhance the brightness of the siliceous material.

23 Claims, No Drawings

METHOD OF BRIGHTENING SILICEOUS FILLERS

FIELD OF THE INVENTION

This invention relates to the manufacture of siliceous fillers. More specifically, this invention relates to a method of brightening or whitening siliceous fillers to further enhance their acceptability, function and use as fillers.

BACKGROUND OF THE INVENTION

There are numerous varieties of filler materials used in industry. Properties of such fillers, such as hardness or softness, particle shape, color, refractive index, inertness, economics, or density make them industrially useful. One such class of fillers are of siliceous composition. Siliceous compositions are those compositions containing silicon dioxide, $SiO_2$, or one of its derivatives. Microcrystalline silica, diatomaceous earth, perlites, volcanic ash and the like are different types of siliceous compounds used to make fillers. These and other industrial minerals are generally mined and require further processing to create fillers.

Fillers of high and low value are used widely in such industries as plastics, paints, adhesives, inks, insulation and the like. The value of the filler is dependent of the degree of processing, supply of the material, physical characteristics such as particle size and suitability to the given application.

With respect to the production of paints and plastics, one valued property of a filler is its color, or degree of whiteness measured by the G.E. Brightness Standard. G.E. Brightness is a well-known standard used to measure brightness wherein a measurement of 100 indicates perfectly white and 0 is perfectly black. G.E. Brightness is measured by a machine manufactured by Photovolt TM of Indianapolis, Ind.

Currently available siliceous materials meet many of the criteria for use as a filler in the applications noted above but are unfavorable in many instances because of insufficient brightness. For example, fillers known as anti-blocking agents are used in the manufacture of plastic sheeting, bags, and thin films. In order to prevent adhesion of plastic film to itself, fine particle size fillers are added to provide a "bumpy" surface on the plastic, thereby reducing their tendency to adhere to each other. In the vast majority of plastic film products being produced, white fillers with no off-color tinting and a refractive index matching that of the plastic are required. Siliceous minerals generally have the proper refractive index to maintain film clarity, but impurities are often present in these fillers. These impurities affect the color and result in discoloration of the plastic.

Another example in which sufficiently bright white siliceous fillers or other minerals are needed is in the formulation of white paints and colored paints using a white "tint base." Paints are made with resins, solvents or water, inert fillers and extenders, and pigments or coloring agents. The majority of these siliceous fillers have poor levels of brightness and possess off-color tints. Due to the presence of these undesirable properties, these siliceous fillers can only be used at low usage levels in paints, despite their excellent resistance to weathering and availability in the proper particle size. White fine siliceous filler material, however, can find new applicability at higher usage levels and find acceptance as a material that can be used to extend the efficiency of the expensive white pigment titanium dioxide, instead of merely acting as a filler, if the siliceous material could be made brighter and whiter.

In view of the above disadvantages, attempts have been made to upgrade inferior quality fillers by trying to improve their degree of brightness, as measured by the G.E. Brightness standard. Usually these methods are too expensive or the other properties of the fillers are radically altered.

For example, in some instances, soda ash (sodium carbonate) is used to brighten such products, but normally very high temperatures are necessary to help brighten the fillers, and the products tend to agglomerate due to the fluxing nature of the chemical. Subsequent comminution of the fluxed material does not usually provide a good yield nor a proper particle distribution of the filler material sought. Some filler material is achievable, using this method, as a by-product during the manufacture of another, coarser, product. Such a method, however, clearly has a low yield.

Other known methods employ wet processes using solvents designed to leach discoloring impurities from the filler. Acids such as ascorbic, citric, sulfuric, and even phosphoric acid have been used to leach discoloring impurities. These processes, however, can be expensive and unwieldy due to disposal problems.

For example, it is known that in paper whitening processes, aluminum silicate clay (i.e., kaolin), which is a siliceous material, is leached with phosphoric acid. This process involves suspending kaolin in a phosphoric acid solution. This mixture has a high concentration of water and low concentrations of both phosphoric acid and kaolin. This process of whitening paper products is performed in a slurry without the use of heat. After some period of time the phosphoric acid/kaolin mixture is filtered out leaving the colorizing agents in the liquid. This method is proven to be economically inefficient because the liquid and colorizing agents must subsequently be disposed and are therefore wasted.

Another method of whitening siliceous compounds is to mix silica with approximately 30% phosphoric acid by weight of the silica. This mixture is heated at temperatures equal to and less than 500° F. After heating the mixture, a solid cementitious material is produced. This cementitious material, however, does not possess a desirable consistency because the mixture is not evenly and finely divided.

SUMMARY OF THE INVENTION

To overcome the aforementioned problems, the present invention, in its broadest sense, provides a method for producing siliceous fillers with enhanced levels of brightness comprising the steps of contacting siliceous fillers with poor brightness with a brightening agent. The filler/agent mixture is then heated at a temperature and for a period of time sufficient to enhance the brightness of the filler.

The brightening agent of the present invention consists of any phosphorous-based acid or salt thereof. The brightness of the filler is enhanced when the filler/agent mixture is heated at temperatures greater than 800° F. for a suitable period of time.

Other objects and features and advantages of the present invention will become apparent from a consideration of the following detailed description.

DETAILED DESCRIPTION OF THE INVENTION

The present invention involves a method for brightening siliceous fillers. This method comprises the steps of mixing a siliceous filler having a relatively poor brightness (for example, 85 G.E. Brightness) with a relatively small quantity of an agent selected from the group consisting of phosphorous or phosphoric-based acids and salts thereof. The filler/agent mixture is then heated in a suitable device at a moderately high temperature for a relatively short period of time, thereby increasing the brightness of the filler to a level that enhances the filler's value and usefulness.

The siliceous filler of the present invention may be any composition containing silicon dioxide, $SiO_2$, or derivatives thereof. Preferably, silica filler is to be used.

The phosphoric or phosphorous-based acid brightening agents are preferably selected from the group consisting of orthophosphoric acid, metaphosphoric acid, hypophosphorous acid, phosphorous acid, polyphosphoric acid or any species of acid compounds of phosphorus and mixtures thereof.

The phosphorous-based acid salt brightening agents are preferably selected from the group consisting of $Na_2HPO_4$, $Na_2HPO_4$, $KH_2PO_4$, $K_2HPO_4$, $(NH_4)H_2PO_4$, $(NH_4)_2HPO_4$, $(NH_4)_3PO_4$, $P_2O_5$ and mixtures thereof.

In the present invention, the preferable brightening agent used is orthophosphoric acid which is generally commercially available as an 85% aqueous solution. Orthophosphoric acid has a minimal physical effect on the siliceous filler particles, requiring the filler/agent mixture to be only lightly milled (i.e., in a blower mill), thus providing a suitably fine, bright, high yield product.

The other phosphorous-based acids, although effective, are more expensive and may require higher levels of use. The phosphorous-based acid salts also are more expensive and may require higher levels of use. Additionally, the use of some of these acid salts may cause the siliceous filler to agglomerate, thus resulting in products that require significantly more processing to get the desired particulate filler product.

The amount of the brightening agent used could be as low as approximately 0.1% by weight of the filler and as high as 12% by weight of the filler or higher depending upon the amount and type of impurities present in the siliceous filler.

Preferably, the amount of brightening agent used in the present invention should be approximately 1.0% by weight of the filler up to approximately 5.0% by weight of the filler. It is ideal to use as little agent as possible in order to achieve the desired levels of brightness for the filler. The amount of brightening agent used in the present invention should not be less than approximately 0.1% by weight of the filler since the brightness of the filler may not be sufficiently enhanced. Further, the amount of the brightening agent used could be greater than 12% by weight of the filler, however, the level of brightness of the filler may not be significantly enhanced in comparison to the cost if amounts greater than 12% are used.

The brightening agent is then applied to the filler in any way which allows the agent to contact the filler. In the present invention it is preferable to spray the brightening agent onto the filler using an atomizing nozzle.

As soon as the brightening agent is sprayed onto the filler, both the brightening agent and filler are mixed together. Any suitable blending device such as a ribbon blender or a modified screw conveyor may be used to mix the brightening agent with the filler after the agent has been sprayed on the filler.

Preferably, the process of the present invention is used in a continuous mode. That is, the filler is conveyed from a position whereupon the agent is sprayed on it to a blender which blends the brightening agent and filler as the resulting blend is heated by conventional means.

The siliceous filler/brightening agent mixture is subjected to heating in a kiln, furnace or any other conventional type oven at temperatures ranging from 800° F., or that temperature which will facilitate brightening when the agent is mixed with the filler, to 2200° F. depending on the filler and its impurities, plus its initial degree of brightness.

The filler will achieve even more enhanced levels of brightness if the filler/agent mixture is heated at temperatures ranging from 1200° F. to 2000° F. However, the more preferable temperature range used to heat the filler/agent mixture of the present invention is from 1400° F. to 1800° F.

If the temperature used in the present invention is greater than approximately 2200° F., the filler/aqent mixture may agglomerate due to the natural melting of silica, $SiO_2$. It is also possible to increase pressure and lower the temperature to achieve the same desired levels of enhanced brightness of the filler.

The filler/agent mixture is heated at the temperature ranges described above for at least one minute and up to one hour. The filler/agent mixture can be heated for over one hour but the desired levels of increased brightness of the filler may not be significantly enhanced in comparison to the cost if the filler/agent mixture is heated longer than one hour.

The resultant filler product of the present invention displays increased levels of brightness by approximately 6 to approximately 40 G.E. Brightness units depending on the beginning level of brightness of the untreated siliceous filler. It is preferable that the resultant filler product exhibits a G.E. Brightness of 93 or higher. Further, the resulting treated siliceous material is particulate and not agglomerated.

The following examples in conjunction with the above general and detailed description more fully illustrate the nature and character of the present invention. The improvements shown in brightness are significant and additionally reflect the ability of the method described in this invention to remove off-colors from the siliceous fillers and hence enhance the clarity or purity of color of the end-use materials made with them. The examples are illustrative only and are not intended to limit the scope of the invention.

EXAMPLE 1

A microcrystalline silica filler from Illinois having an initial G.E. Brightness of 88.5 was mixed with orthophosphoric acid which was present in the amount of 1.0% by weight of the filler. The acid was applied to the filler by spraying the filler with a solution consisting of the 1% by weight acid diluted to eight gallons per ton of filler. The mixture was then heated in a kiln for ten minutes at 1800° F. The resultant product achieved a G.E. Brightness of 95.

EXAMPLE 2

A microcrystalline silica filler from Illinois having an initial G.E. Brightness of 88.5 was mixed with orthophosphoric acid which was present in the amount of 2.0% by weight of the filler. The acid was applied to the filler by spraying the filler with a solution consisting of the 2% by weight acid diluted to eight gallons per ton of filler. The mixture was then heated in a kiln for ten minutes at 1400° F. The resultant product achieved a G.E. Brightness of 95.

EXAMPLE 3

An amorphous silica filler from California possessing an initial G.E. Brightness of 60 was mixed with orthophosphoric acid present in the amount of 10% by weight of the filler. The acid was applied to the filler by spraying the filler with a solution consisting of the 10% by weight acid diluted to twenty-six gallons per ton of filler. The mixture was then heated in a kiln for 43 minutes at 1800° F. The resultant product achieved a G.E. Brightness of 93.

EXAMPLE 4

A microcrystalline silica from Illinois having an initial G.E. Brightness 86 was blended with orthophosphoric acid which was present in the amount of 2% by weight of the filler. The acid was applied to the filler by spraying the filler with a solution consisting of the 2% by weight acid diluted to eight gallons per ton of filler. The mixture was heated in a kiln at 1400° F. for 15 minutes. The resulting product achieved a G.E. Brightness of 95.

The examples are illustrative of three of the parameters necessary to bring out the desired brightness in the material being upgraded: Quantity of reagent, Time and Temperature. These parameters vary according to the given filler material, its impurities and its initial G.E. Brightness. The process of the present invention will have a favorable effect on most siliceous fillers within the scope of what has been described.

One of the advantages of the present invention is that only a relatively small amount of the orthophosphoric acid solution needs to be mixed with the filler. Preferably four gallons to forty gallons of diluted orthophosphoric acid per one ton of filler need to be mixed. Lesser amounts of the orthophosphoric acid may be blended with the filler, however, blending the mixture becomes more difficult and may take longer to achieve, thus becoming detrimental to a continuous process. Greater amounts of the orthophosphoric acid may be used, but this would be superfluous and would require more heat to extract the excess water.

Another advantage of the present invention is that very little additional processing of the filler product is necessary after treatment. For example, light milling performed in a blower mill may be all that is necessary in order to achieve a suitably fine and particulate filler product. The filler product remains relatively soft after treatment, and the physical properties of the filler remain relatively intact. The product may need a little harder milling when subjected to heat in the higher temperature ranges, but a suitable finished product is nevertheless attained at good yields.

A further advantage of the process of the present invention is that only minimal additional equipment is needed to incorporate this process into existing siliceous filler plants. Some alteration might be required in the heat sources of the plants and also some minor adjustments in the continuous process. Nevertheless, the improvement in the siliceous filler products opens up new avenues of marketability, well worth the modifications.

In summary, the present invention achieves its primary objective, namely efficiently and economically enhancing the brightness of siliceous fillers in order to make them more valuable and open new markets for them. The method involves the steps of contacting the siliceous material with an agent consisting of phosphorous-based acids and salts thereof. This mixture is then heated at temperatures and for a period of time sufficient to enhance the brightness and prevent the agglomeration of the siliceous material.

While this invention has been particularly shown and described in reference to the preferred embodiments and specific examples set forth above, it will be understood by those skilled in the art that changes in form and detail may be made without departing from the spirit or scope of the invention. Accordingly, the present invention is not limited to the specific arrangements described in the foregoing detailed description.

What is claimed is:

1. A method for increasing the brightness of siliceous materials, the method comprising the steps of:
   contacting the siliceous material with an agent selected from the group consisting of phosphorous-based acids or salts thereof to thereby form a mixture; and
   heating the resulting siliceous material and agent mixture at a temperature greater than or equal to 800° F.

2. The method of claim 1 wherein the phosphorous-based acids are selected from the group consisting of orthophosphoric acid, metaphosphoric acid, hypophosphorous acid, phosphorous acid, polyphosphoric acid, and mixtures thereof.

3. The method of claim 1 wherein the phosphorous-based acid salts are selected from the group consisting of $Na_2HPO_4$, $KH_2PO_4$, $K_2HPO_4$, $(NH_4)H_2PO_4$, $(NH_4)_2HPO_4$, $(NH_4)_3PO_4$, $P_2O_5$ and mixtures thereof.

4. The method of claim 1 wherein the agent is orthophosphoric acid.

5. The method of claim 1 wherein the amount of the agent is at least 0.1% by weight of the siliceous material.

6. The method of claim 1 wherein the amount of the agent ranges from 1.0% to 12% by weight of the siliceous material.

7. The method of claim 1 wherein the amount of the agent ranges from 1.0% to 5.0% by weight of the siliceous material.

8. The method of claim 1 wherein the heating occurs at temperatures ranging from 800° F. to 2200° F.

9. The method of claim 1 wherein the heating occurs at temperatures ranging from 1200° F. to 2000° F.

10. The method of claim 1 wherein the heating occurs at temperatures ranging from 1400° F. to 1800° F.

11. The method of claim 1 wherein the siliceous material increases in brightness ranging from 6 to 40 G.E. Brightness units.

12. The method of claim 8 wherein the siliceous material and agent mixture is heated at the temperature range for at least one minute.

13. The method of claim 8 wherein the siliceous material and agent mixture is heated at the temperature range for one minute to one hour.

14. A method for brightening siliceous materials comprising the following steps:

spraying a phosphorous-based acid or phosphorous-based acid equivalent upon the siliceous material;
mixing the agent with the siliceous material; and
heating the mixture.

15. The method of claim 14 wherein the agent is orthophosphoric acid.

16. The method of claim 14 wherein the siliceous material is silica.

17. The method of claim 14 wherein the agent is 0.1% to 12% by weight of the siliceous material.

18. The method of claim 14 wherein the siliceous material and agent mixture is heated at temperatures ranging from 800° F. to 2200° F.

19. The method of claim 18 wherein the siliceous material and agent mixture is heated at the temperature range from one minute to one hour.

20. The method of claim 14 wherein the siliceous material increases in brightness by at least 6 G.E. Brightness units.

21. A method of brightening siliceous materials comprising the following steps:
mixing the siliceous material with orthophosphoric acid, wherein the orthophosphoric acid is present in an amount of 1.0% to 5.0% by weight of the siliceous material; and
heating the siliceous material and agent mixture at temperatures ranging from 800° F. to 2200° F. for at least one minute, whereby the resulting treated siliceous material exhibits increased levels of brightness by at least 6 G.E. Brightness units.

22. A method for brightening siliceous materials, the method comprising the steps of:
contacting the siliceous material with an amount of a phosphorous-based acid or salt thereof sufficient to increase the brightness of the material when the material and agent mixture is heated at temperatures above 800° F. for at least one minute.

23. A method for brightening siliceous materials, the method comprising the steps of:
contacting the siliceous material with an amount of a phosphorous-based acid or salt thereof greater than 0.1% by weight of the siliceous material; and
heating the siliceous material and agent mixture at a temperature and for a period of time sufficient to increase the brightness of the material.

* * * * *